UNITED STATES PATENT OFFICE.

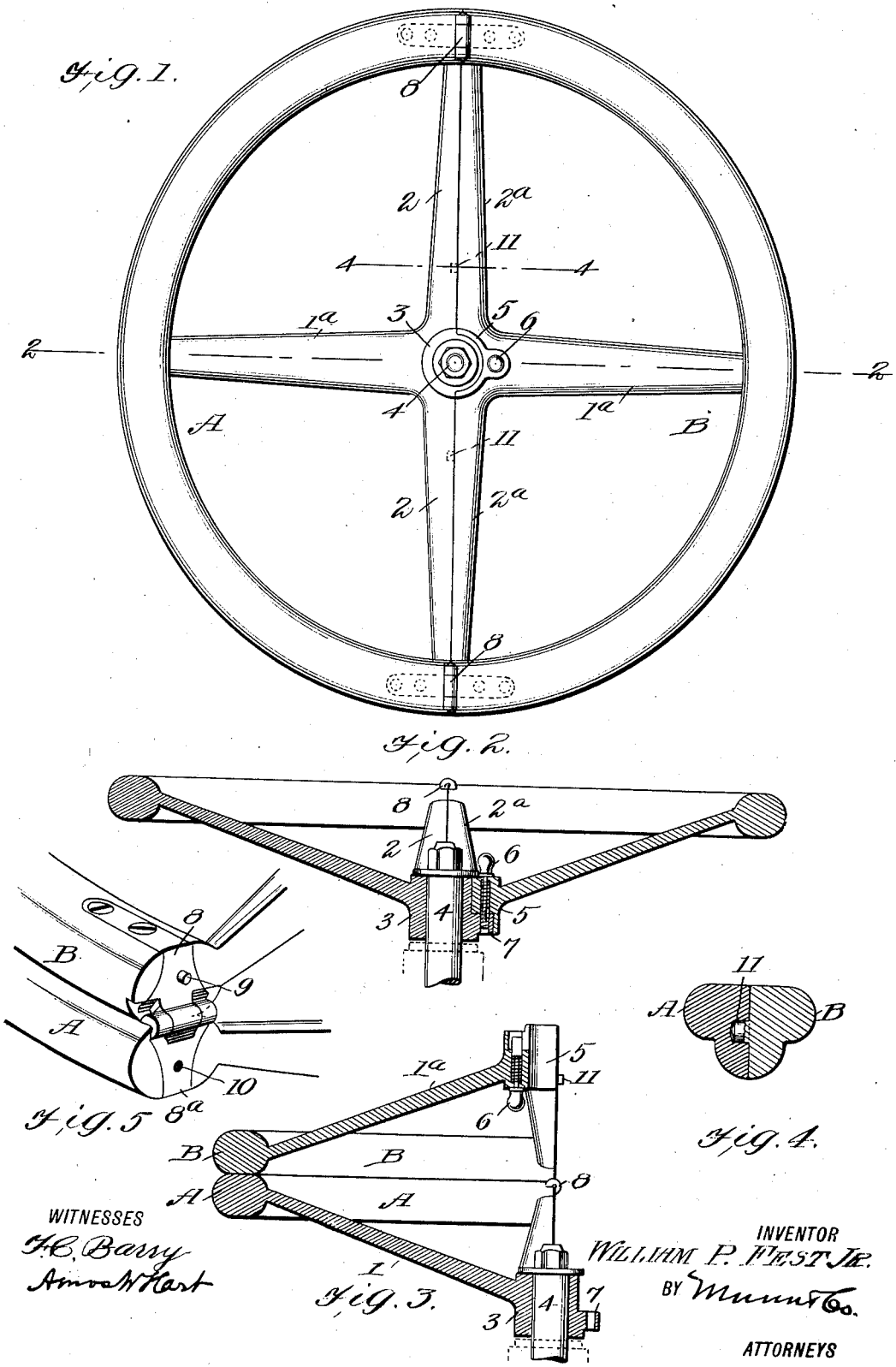

WILLIAM P. FEST, JR., OF BUFFALO, NEW YORK.

STEERING-WHEEL FOR AUTOVEHICLES.

1,002,663.  Specification of Letters Patent.  Patented Sept. 5, 1911.

Application filed April 13, 1911. Serial No. 620,725.

*To all whom it may concern:*

Be it known that I, WILLIAM P. FEST, Jr., a citizen of the United States, and a resident of Buffalo, in the county of Erie and State of New York, have invented an Improvement in Steering-Wheels for Autovehicles, of which the following is a specification.

The rim of my improved steering-wheel is divided transversely so that it is formed practically in halves, or nearly equal semicircular sections, one of which is fast on the steering-shaft and the other hinged and thus adapted to be raised and folded back upon the fixed section so that it will not obstruct the chauffeur in entering and leaving his seat.

A manually operable device is employed for locking and releasing the hinged wheel-section, and supplemental means are provided to aid in holding the hinged section rigidly when in working position.

The details of construction, arrangement, and combination of parts are as hereinafter described, and illustrated in the accompanying drawing, in which—

Figure 1 is a plan view of the wheel. Fig. 2 is a transverse section on the line 2—2 of Fig. 1. Fig. 3 is a transverse section of the two parts of the wheel when the hinged section is folded upon the other. Fig. 4 is a transverse section on the line 4—4 of Fig. 1. Fig. 5 is a perspective view illustrating the hinge connection between the sections.

A and B indicate the respective sections, or halves, of the wheel. The spokes 1 and 1$^a$ are cast integrally with the halves 2 and 2$^a$ of other spokes arranged at right angles to the first-named ones. The spoke 1 and spoke sections 2 are cast integrally with a sleeve 3 which constitutes the socket for reception of the steering-shaft 4, that is secured thereto by key and nut, or otherwise, as judgment may dictate.

The spoke 1$^a$ and spoke sections 2$^a$ are cast integrally with a semicircular or half socket 5, which is adapted to fit around the projecting side of the shaft socket 3, so that when the hinged section B is in working position, as in Figs. 1 and 2, the socket portions are closely connected. For locking the hinged section B in this position, I provide a spring-actuated bolt 6, which is adapted to enter a perforation in a lug 7 that is cast with, and projects laterally from, the shaft sockets, as shown in Figs. 2 and 3.

The two sections A and B are connected by hinges 8 and 8$^a$ whose respective sections are constructed in right-angular form and fitted in grooves formed in the ends and under sides of the sections A and B, as shown in Fig. 5. The hinged section 8 is provided with an integral dowel 9, which is adapted to enter a socket 10 in the opposite hinged section 8$^a$. As a further aid in holding the spoke sections 2 and 2$^a$ rigidly connected when the wheel is in working form, I provide such spoke sections with dowels 11, as indicated in Figs. 1 and 4.

It will be seen that, by raising the bolt 6 so that its free end is clear of the socket at 7, the hinged section B may be raised and turned back upon the other, as shown in Figs. 3 and 5, whereby the space occupied by half of the wheel is then available to facilitate the chauffeur's entrance into, and exit from, the vehicle. Upon turning down the hinged section B to working position, as in Figs. 1 and 2, the spring catch may be easily and quickly adjusted to lock the sections firmly together.

My improved attachment is a great convenience, and the strength and rigidity of the wheel as a whole are not sensibly impaired when the parts are duly locked together.

What I claim is:—

1. An improved steering-wheel for auto vehicles, formed in sections one of which is rigidly secured to a steering-shaft and the other hinged to the fixed section, so that it may be folded back upon the same, and means for locking the two sections rigidly together when in normal position, substantially as described.

2. The improved steering-wheel for auto vehicles, which is formed in practically equal sections, the spokes of one section being formed integrally with a socket adapted to receive the steering-shaft and the spokes of the hinged section provided with a half socket adapted to fit upon the first-named one, and means for detachably locking the sections together, substantially as described.

3. The improved steering-wheel for auto vehicles, comprising two practically equal sections, one of which is provided with spokes and a socket to receive the steering shaft and with a laterally projecting apertured lug, and the other or hinged section having spokes provided at their junction with a fastening device adapted for speedy manipulation, whereby it may be easily and quickly adjusted for locking or releasing the hinged section, as shown and described.

4. The improved steering-wheel formed in practically equal sections, hinges connecting the semicircular portions of the wheel and provided with dowels and sockets as described, the central or hub portions which are cast integrally with the spokes being adapted also to fit together, and a fastening means for securing them in such position, substantially as described.

WILLIAM P. FEST, Jr.

Witnesses:
HERMAN E. FEST,
CLAYTON S. HEINZE.